(12) United States Patent
Brunk et al.

(10) Patent No.: US 6,648,508 B1
(45) Date of Patent: Nov. 18, 2003

(54) LINEAR GUIDE

(75) Inventors: Michael Brunk, Schwalbach (DE); Achim Steigner, Frohnhofen (DE); Reiner Schindler, Krahenberg (DE)

(73) Assignee: INA-Schaeffler KG (DE)

( * ) Notice: Subject to any disclaimer, the term of this patent is extended or adjusted under 35 U.S.C. 154(b) by 10 days.

(21) Appl. No.: 10/070,397

(22) PCT Filed: Aug. 22, 2000

(86) PCT No.: PCT/EP00/08156

§ 371 (c)(1),
(2), (4) Date: Apr. 16, 2002

(87) PCT Pub. No.: WO01/18414

PCT Pub. Date: Mar. 15, 2001

(30) Foreign Application Priority Data

Sep. 3, 1999 (DE) .......................................... 199 42 058

(51) Int. Cl.[7] .............................................. F16C 29/12
(52) U.S. Cl. ............................... 384/57; 384/48; 384/58
(58) Field of Search .................... 384/48, 49, 50, 384/53, 55, 57, 58, 59

(56) References Cited

U.S. PATENT DOCUMENTS

| 3,216,759 A | 11/1965 | Williams |
| 3,407,011 A | 10/1968 | Zeidler |
| 3,998,497 A | * 12/1976 | Koizumi ...................... 384/53 |
| 4,347,916 A | * 9/1982 | Schroder ...................... 384/58 |
| 4,457,567 A | * 7/1984 | Kraan ......................... 384/53 |
| 4,715,730 A | 12/1987 | Magnuson |
| 4,863,288 A | * 9/1989 | Houck .......................... 384/19 |
| 5,642,941 A | * 7/1997 | Mouezy ....................... 384/57 |
| 5,792,033 A | * 8/1998 | Merrithew .................... 384/57 |
| 5,915,840 A | 6/1999 | Zaguroli, Jr. et al. ......... 384/53 |

FOREIGN PATENT DOCUMENTS

| DE | 1427645 | 11/1968 |
| DE | 9206715 | 9/1992 |
| DE | 9209047 | 9/1992 |
| FR | 2700322 | 7/1994 |

* cited by examiner

Primary Examiner—Thomas R. Hannon
(74) Attorney, Agent, or Firm—Muserlian, Lucas and Mercanti

(57) ABSTRACT

A linear guide comprises a traveling carriage (1) having track rollers (11) for support and for rolling along a guide rail (5), said track rollers (11), each of which rolls on the guide rail (5), being mounted in pairs for rotation on a first support (7) that is arranged on a first carriage plate (2) of the traveling carriage (1). The traveling carriage (1) comprises a further carriage plate (3) with a second support (14) arranged thereon, and track rollers (17) rotatably mounted on said second support (14) for rolling on a further guide rail (6), the two guide rails (5, 6) being parallel to each other and fixed on two longitudinal sides of a central rail support (4).

3 Claims, 1 Drawing Sheet

LINEAR GUIDE

FIELD OF THE INVENTION

The invention concerns a linear guide having a traveling carriage comprising track rollers for support and for rolling along a guide rail, said track rollers, each of which rolls on the guide rail, being mounted in pairs for rotation on a first support that is arranged on a first carriage plate of the traveling carriage, said traveling carriage also comprising a further carriage plate with a second support arranged thereon, and track rollers rotatably mounted on said second support for rolling on a further guide rail, the two guide rails being parallel to each other and fixed on two longitudinal sides of a central rail support.

BACKGROUND OF THE INVENTION

A similar linear guide is known from the document DE 92 09 047 U1. This shows a guide carriage in which, to achieve a play-free travel along the guide rail in the region of curves, i.e. in bent sections of the path, a needle roller thrust bearing is arranged between a pivotable support and a carriage plate in the region of the axle of each track roller for rotation about this axle. A raceway carrier of this bearing is firmly connected to the carriage plate and comprises a support surface that forms an arc-shaped segment on which less than half the rolling elements roll. This arrangement was chosen to keep any moments of load that may occur, for example, moments about the longitudinal axis of the guide rail, away from the needle roller thrust bearing and the associated support surface. This, however, has the drawback of a complex and expensive structure and assembly. Besides this, there are cases of use in which a single carriage plate with track rollers mounted thereon for guiding a machine component and transmitting occurring forces and moments is not sufficient.

From the document U.S. Pat. No. 5,915,840, a linear guide of the initially cited type is known in which a first support for a pair of track rollers is configured as an angle piece that is welded on a plate. The plate is fixed on an upper leg of the traveling carriage by a cap screw. This leg corresponds to the first carriage plate of the linear guide according to the invention. The second support for track rollers has the same configuration and is fixed on a lower leg of the traveling carriage. This leg corresponds to the further carriage plate of the linear guide according to the invention. However, an additional setting screw is provided in this prior art. The distance between the first and the second support must be set here by adjusting the setting screw to avoid a bracing of the track rollers.

SUMMARY OF THE INVENTION

The object of the invention is to provide a linear guide whose traveling carriage is suitable for the transmission of large forces and moments and that has good running properties so that a bracing of the track rollers mounted thereon does not occur.

The invention achieves this object by the fact that the traveling carriage is configured as a pivoted bolster carriage in which the first support is pivotally mounted on the first carriage plate and the second support is pivotally mounted on the further carriage plate, the rotatable mounting of the track rollers that are retained by the first carriage plate through the first support being configured as a fixed bearing, while the rotatable mounting of the track rollers that are retained by the further carriage plate through the second support is configured as a movable bearing.

In the fixed bearing, the track rollers may be rotatably mounted on the support through-ball bearings. In the movable bearing, in contrast, it is possible to mount the track rollers rotatably on the support through cylindrical roller bearings or needle roller bearings.

The invention makes it possible to give both the guide rails that are to be mounted on the rail support a fully identical configuration, and all the track rollers can have the same profile on their outer peripheral surfaces with which they roll on the guide rails. Therefore, only one type of guide rails and, possibly also, only one type of profiled rollers are required.

If, in contrast, one of the carriage plates of the traveling carriage were equipped with profiled track rollers for a fixed bearing and the other carriage plate were equipped with cylindrical track rollers to obtain a movable bearing, not only would different track rollers be required but also different guide rails. In this case, the cylindrical track rollers would have to be supported on a guide rail having a flat running surface, so that, to compensate for inexactitudes of the connecting structure, the track rollers would be able to be displaced in axial direction by sliding over the flat running surface. A drawback of such a construction would be that the rollers would generally only transmit radial loads and a moment loading would hardly be possible. This means that two guide rails with different profiles would be required for mounted and the bearing with the cylindrical track roller would be subjected to increased tilting with edge running, and this could lead to a reduction of durability and working life.

With a parallel arrangement of the guide rails, the problem necessarily arises that, due to the addition of the tolerances of the rails and the connecting structure, the track rollers get braced in axial direction if no movable bearing is provided. This leads to a reduction of the durability of the track rollers and guide rails. These problems are avoided by the use of a carriage with a movable bearing and the durability and running properties are positively influenced. In a movable bearing carriage according to the invention, in which a part of the track rollers are mounted on cylindrical rollers, an axial displaceability of the outer ring of the profiled roller bearing is created which compensates for the inexactitudes encountered in axial direction. Demands on the connecting structure can therefore be reduced.

The novel principle of functioning of a fixed bearing/movable bearing combination on a traveling carriage can be implemented with different types of rails. For forming the movable bearing of the traveling carriage, profiled track rollers with a slidable outer ring can be used. This makes it possible to compensate for inexactitudes of the connecting structure in the axial direction of the roller while retaining the use of standard rails. Due to this compensation, a bracing of the track rollers is avoided, and this results in a reduction of wear and resistance and an enhancement of durability and working life of the track rollers.

BRIEF DESCRIPTION OF THE DRAWINGS

One example of embodiment of the invention is illustrated in the drawings and will be described more closely below. The drawings show.

DETAILED DESCRIPTION OF THE DRAWINGS

Figure 1:
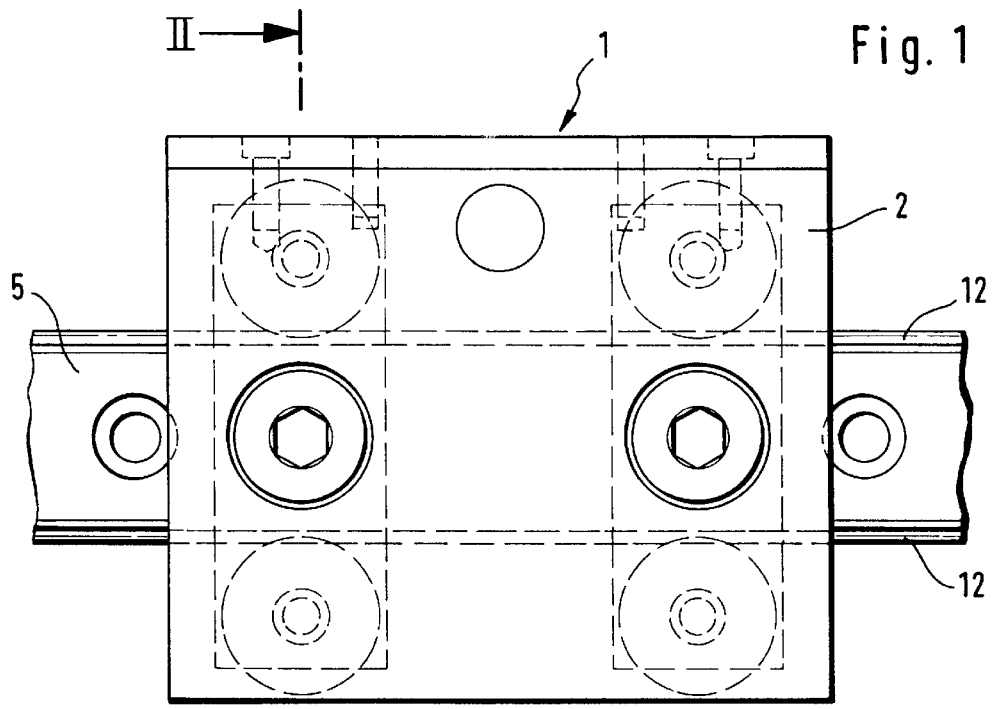
FIG. 1, a side view of a traveling carriage supported on guide rails.
Figure 2:
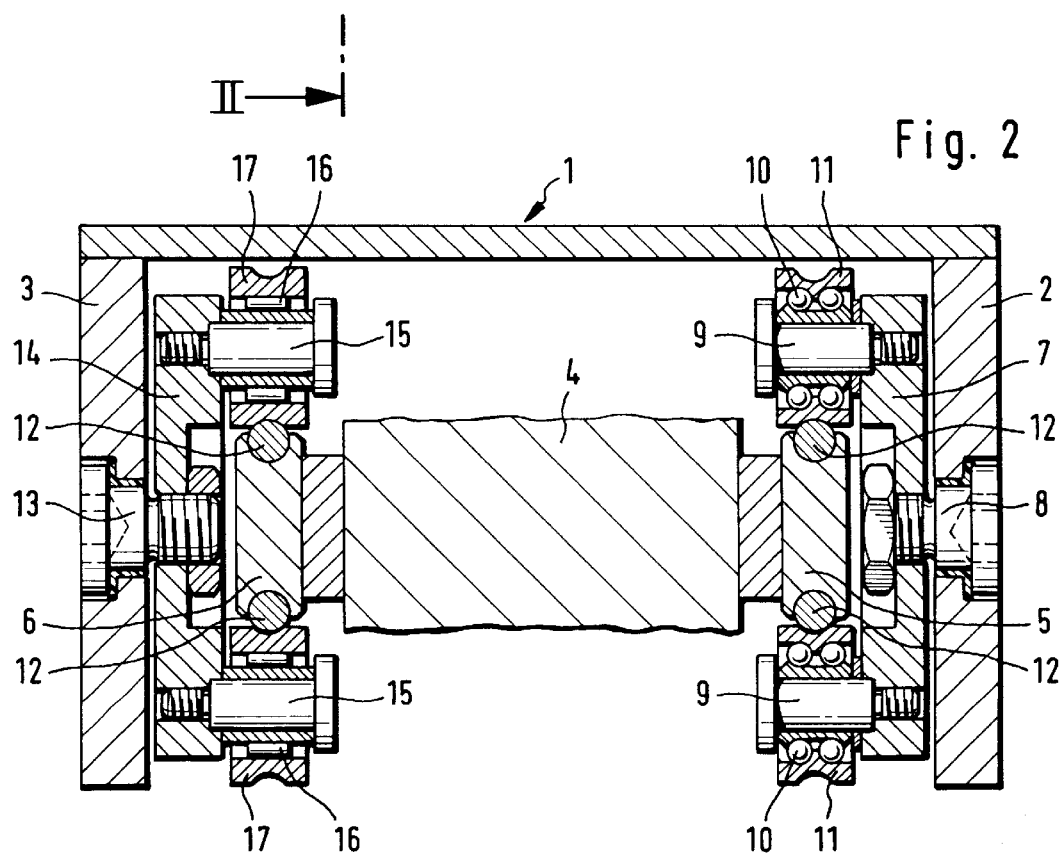
FIG. 2, a cross-section through the travelling carriage and the guide rails taken along line II—II of FIG. 1.

A traveling carriage 1 according to the invention is U-shaped in cross-section, and legs of the U are formed by a first carriage plate 2 and a further carriage plate 3. With these legs, the traveling carriage 1 surrounds a rail support 4 on whose two lateral longitudinal surfaces are fixed, on the right-hand side in FIG. 2, a first guide rail 5 and, on the left-hand side in FIG. 2, a further guide rail 6. At least one support 7 is pivotally mounted on the first plate carriage 2 through a pivot bearing 8 having a horizontal axis of pivot. The support 7 is situated on the inside of the first carriage plate 2 and carries on its two ends, horizontally arranged bearing journals 9 for ball bearings 10. These serve for the rotatable mounting of track rollers 11 having profiled outer peripheral surfaces. The track rollers 11 are supported on track wires 12 that are arranged and retained in longitudinal grooves of the first guide rail 5.

As a mirror image of the above arrangement, the further carriage plate 3 also comprises a pivot bearing 13 for a support 14. At least one such support 14 is pivotally mounted on the inner side of further carriage plate 3. On its two ends, this support 14 comprises horizontally extending bearing journals 15 for cylindrical roller bearings 16 through which profiled track rollers 17 are rotatably mounted. The track rollers 17 are supported through their profiled outer peripheral surfaces on track wires 12 that are arranged and fixed in longitudinal grooves of the further guide rail 6.

The invention makes it possible to use for this travelling carriage 1, two identical guide rails 5 and 6 and track rollers 11 and 17 having outer peripheral surfaces with the same outer profile.

List of Reference Numerals

1 Traveling carriage
2 First carriage plate
3 Further carriage plate
4 Rail support
5 First guide rail
6 Further guide rail
7 First support
8 Pivot bearing
9 Bearing journal
10 Ball bearing
11 Track roller
12 Track wire
13 Pivot bearing
14 Second support
15 Bearing journal
16 Cylindrical roller bearing
17 Track roller

What is claimed is:

1. A linear guide having a traveling carriage (1) comprising track rollers (11) for support and for rolling along a guide rail (5), said track rollers (11), each of which rolls on the guide rail (5), being mounted in pairs for rotation on a first support (7) that is arranged on a first carriage plate (2) of the traveling carriage (1), said traveling carriage (1) comprising a further carriage plate (3) with a second support (14) arranged thereon, and track rollers (17) rotatably mounted on said second support (14) for rolling on a further guide rail (6), the two guide rails (5, 6) being parallel to each other and fixed on two longitudinal sides of a central rail support (4), characterized in that the traveling carriage (1) is configured as a pivoted bolster carriage in which the first support (7) is pivotally mounted on the first carriage plate (2) and the second support (14) is pivotally mounted on the further carriage plate (3), the rotatable mounting of the track rollers (11) that are retained by the first carriage plate (2) through the first support (7) being configured as a fixed bearing, while the rotatable mounting of the track rollers (17) that are retained by the further carriage plate (3) through the second support (14) is configured as a movable bearing.

2. A linear guide according to claim 1, characterized in that the track rollers (11) are rotatably mounted on the support (7) through ball bearings (10).

3. A linear guide according to claim 1, characterized in that the track rollers (17) are rotatably mounted on the support (14) through cylindrical roller bearings (16).

* * * * *